United States Patent
Fujishiro et al.

(10) Patent No.: US 12,477,607 B2
(45) Date of Patent: Nov. 18, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 423 days.

(21) Appl. No.: 17/819,158

(22) Filed: Aug. 11, 2022

(65) Prior Publication Data
US 2022/0386404 A1   Dec. 1, 2022

Related U.S. Application Data

(63) Continuation of application No. PCT/JP2021/004116, filed on Feb. 4, 2021.

(60) Provisional application No. 62/975,290, filed on Feb. 12, 2020.

(51) Int. Cl.
*H04W 76/18* (2018.01)
*H04B 7/185* (2006.01)
*H04W 40/22* (2009.01)

(52) U.S. Cl.
CPC ........ *H04W 76/18* (2018.02); *H04B 7/18513* (2013.01); *H04W 40/22* (2013.01)

(58) Field of Classification Search
CPC ... H04W 76/18; H04W 40/22; H04W 84/047; H04W 88/085; H04W 24/04; H04W 76/19
See application file for complete search history.

(56) References Cited

U.S. PATENT DOCUMENTS

| | | | |
|---|---|---|---|
| 11,882,516 B2* | 1/2024 | Marinier | H04W 48/16 |
| 2020/0092784 A1* | 3/2020 | Hampel | H04W 76/27 |
| 2021/0112415 A1* | 4/2021 | Lee | H04L 69/40 |
| 2022/0015011 A1* | 1/2022 | Liu | H04W 76/15 |
| 2022/0086749 A1* | 3/2022 | Ishii | H04W 40/22 |
| 2022/0151006 A1* | 5/2022 | Muhammad | H04W 76/20 |
| 2022/0159768 A1* | 5/2022 | Zhu | H04L 1/1874 |
| 2022/0255689 A1* | 8/2022 | Wen | H04W 72/542 |
| 2022/0303763 A1* | 9/2022 | Guo | H04W 12/037 |
| 2022/0408275 A1* | 12/2022 | Awada | H04W 16/26 |
| 2023/0189377 A1* | 6/2023 | Fujishiro | H04W 76/19 455/423 |

(Continued)

OTHER PUBLICATIONS

ZTE, Sanechips; "Discussion on IAB BH RLF handling"; 3GPP TSG RAN WG2 Meeting #108; R2-1915119; Nov. 18-22, 2019; Total 6 pages; Reno, USA.

(Continued)

*Primary Examiner* — Angelica Perez
(74) *Attorney, Agent, or Firm* — Studebaker Brackett PLLC

(57) ABSTRACT

A communication control method includes, by a relay node relaying communication between a lower node and an upper node, detecting a failure in a first radio link between the upper node and the relay node, by the relay node, in response to the detection of the failure, transmitting, to the lower node, a first notification indicating the detection of the failure and attempting recovery of the first radio link, and, by the lower node, executing predetermined processing in a state of maintaining a second radio link with the relay node until a predetermined time period elapses after reception of the first notification from the relay node.

5 Claims, 16 Drawing Sheets

(56) References Cited

U.S. PATENT DOCUMENTS

2024/0267969 A1* 8/2024 Fujishiro ............... H04W 76/15

OTHER PUBLICATIONS

Kyocera; "Possible issues on Backhaul RLF handling"; 3GPP TSG RAN WG2 Meeting #108; R2-1915598; Nov. 18-22, 2019; Total 5 pages; Reno, USA.
LG Electronics; "Resolving open issues on BH RLF"; 3GPP TSG RAN WG2 Meeting #108; R2-1916169; Nov. 17-23, 2019; Total 3 pages; Reno, USA.

* cited by examiner

COMMUNICATION CONTROL METHOD

RELATED APPLICATIONS

The present application is a continuation based on PCT Application No. PCT/JP2021/004116, filed on Feb. 4, 2021, which claims the benefit of U.S. Provisional Patent Application No. 62/975,290 filed on Feb. 12, 2020. The content of which is incorporated by reference herein in their entirety.

TECHNICAL FIELD

The present disclosure relates to a communication control method used in a mobile communication system.

BACKGROUND ART

In the 3rd Generation Partnership Project (3GPP), which is a standardization project of a mobile communication system, a new relay node referred to as an Integrated Access and Backhaul (IAB) node has been under study. One or a plurality of relay nodes are involved in communication between a donor base station and a user equipment and perform relay for the communication.

Such a relay node includes a first functional unit and a second functional unit, performs wireless communication with an upper node (a base station or an upper relay node) by using the second functional unit, and performs wireless communication with a lower node (a user equipment or a lower relay node) by using the first functional unit.

SUMMARY OF INVENTION

A communication control method according to an aspect includes, by a relay node relaying communication between a lower node and an upper node, detecting a failure in a first radio link between the upper node and the relay node, by the relay node, in response to the detection of the failure, transmitting, to the lower node, a first notification indicating the detection of the failure and attempting recovery of the first radio link, and, by the lower node, executing predetermined processing in a state of maintaining a second radio link with the relay node until a predetermined time period elapses after reception of the first notification from the relay node.

DESCRIPTION OF EMBODIMENTS

A mobile communication system according to an embodiment will be described with reference to the drawings. In the description of the drawings, the same or similar parts are denoted by the same or similar reference signs.

Configuration of Mobile Communication System

Figure 1:
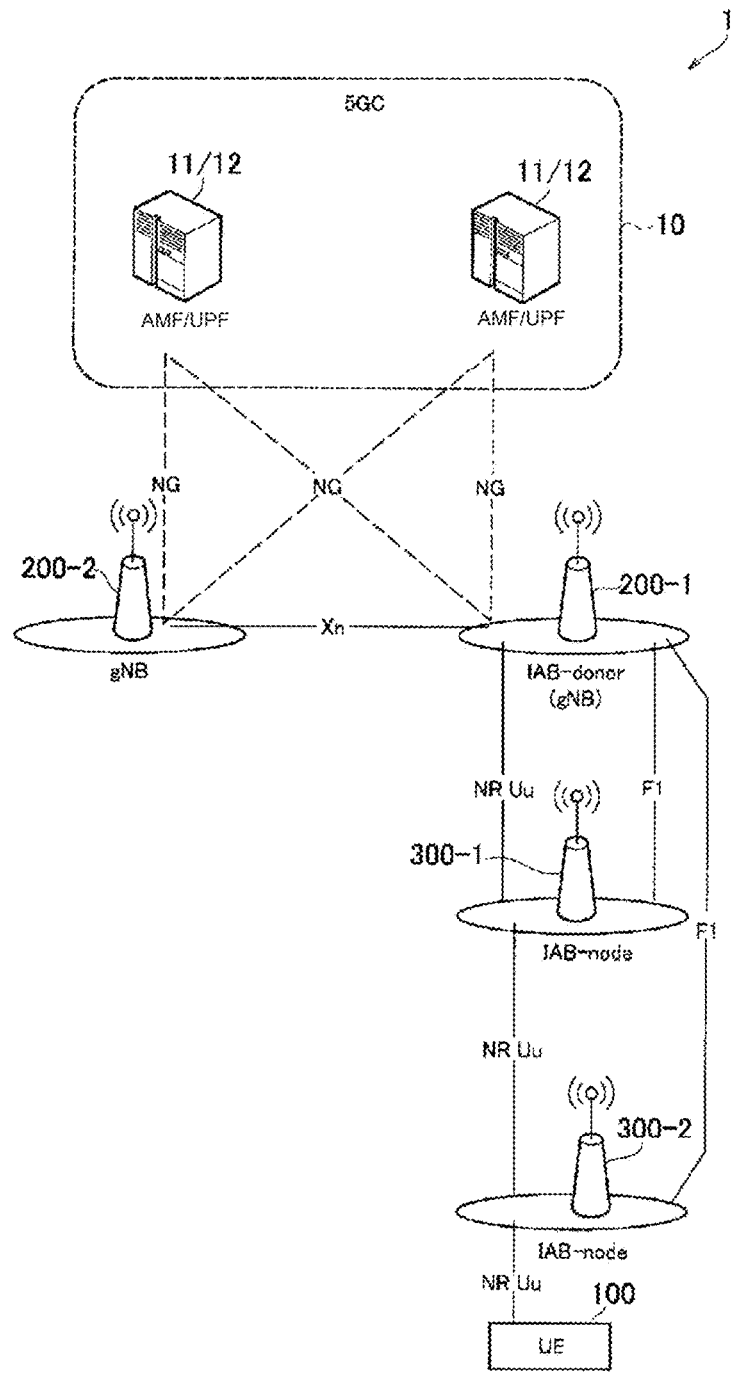
FIG. 1 is a diagram illustrating a configuration of a mobile communication system according to an embodiment.

First, a configuration of a mobile communication system according to an embodiment will be described. FIG. 1 is a diagram illustrating a configuration of the mobile communication system 1 according to an embodiment.

The mobile communication system 1 is a fifth generation (5G) mobile communication system based on the 3GPP standard. Specifically, a radio access scheme in the mobile communication system 1 is New Radio (NR) being a radio access scheme of 5G. Note that Long Term Evolution (LTE) may be at least partially applied to the mobile communication system 1.

As illustrated in FIG. 1, the mobile communication system 1 includes a 5G core network (5GC) 10, a user equipment (UE) 100, a base station (referred to as a gNB) 200, and an IAB node 300. The IAB node 300 is an example of a relay node. An embodiment mainly describes an example in which the base station is an NR base station. However, the base station may be an LTE base station (that is, an eNB).

The 5GC 10 includes an Access and Mobility Management Function (AMF) 11 and a User Plane Function (UPF) 12. The AMF 11 is an apparatus that performs various types of mobility control and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node that manages one or a plurality of cells. The cell is used as a term denoting a minimum unit of a wireless communication area. The cell may be used as a term denoting a function or a resource for performing wireless communication with the UE 100. One cell belongs to one carrier frequency.

Each gNB 200 is connected to the 5GC 10 each other via an interface referred to as an NG interface. FIG. 1 illustrates an example of two gNBs, a gNB 200-1 and a gNB 200-2 that are connected to the 5GC 10.

Each gNB 200 is connected to another gNB 200 in an adjacency relationship via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are connected to each other via an interface referred to as an F1 interface. The F1 protocol is a communication protocol between the CU and the DU and includes an F1-C protocol corresponding to a protocol for a control plane and an F1-U protocol corresponding to a protocol for a user plane.

The mobile communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul enables a multi-hop through a plurality of hops (in other words, a plurality of IAB nodes 300).

Each IAB node 300 includes a DU corresponding to a first functional unit and a Mobile Terminal (MT) corresponding to a second functional unit.

The MT is connected to the DU of an upper node (upper IAB node or a donor gNB 200-1). The MT is connected to the CU of the donor gNB 200-1 by using RRC, and establishes, with the donor gNB 200-1, a signaling radio bearer (SRB) that carries an RRC message and an NAS message. An adjacent node (that is, an upper node) on an NR Uu wireless interface of the MT may be referred to as a "parent node". A radio link between the MT of the IAB node 300 and the upper node is referred to as a backhaul link (BH link).

The DU manages cells similarly to the gNB 200. The DU terminates the NR Uu wireless interface to the UE 100 and a lower IAB node. The DU supports the F1 protocol for the CU of the donor gNB 200-1. An adjacent node (that is, a lower node) on an NR access interface of the DU may be referred to as a "child node".

All IAB nodes 300 connected to the donor gNB 200-1 via one or a plurality of hops form a Directed Acyclic Graph (DAG) topology rooted in the donor gNB 200-1. The DAG topology may be referred to as an IAB topology. In the DAG topology, the direction of the parent node may be referred to as upstream or upper, and the direction of the child node may be referred to as downstream or lower.

An example is illustrated in FIG. 1 in which the IAB node 300-1 is wirelessly connected to the donor gNB 200-1, the IAB node 300-2 is wirelessly connected to the IAB node 300-1, and the F1 protocol is transmitted via two backhaul hops.

The UE 100 is a movable wireless communication apparatus that performs wireless communication with cells. The UE 100 may be any type of apparatus as long as the UE 100 performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the upper node (IAB node 300 or gNB 200) via an access link.

FIG. 1 illustrates an example in which the UE 100 is wirelessly connected to the IAB node 300-2. The UE 100 indirectly communicates with the donor gNB 200-1 via the IAB node 300-2 and the IAB node 300-1. Specifically, the IAB node 300-2 and the IAB node 300-1 relay uplink data from the UE 100 to the donor gNB 200-1 and relay downlink data from the gNB 200-1 to the UE 100.

Figure 2:
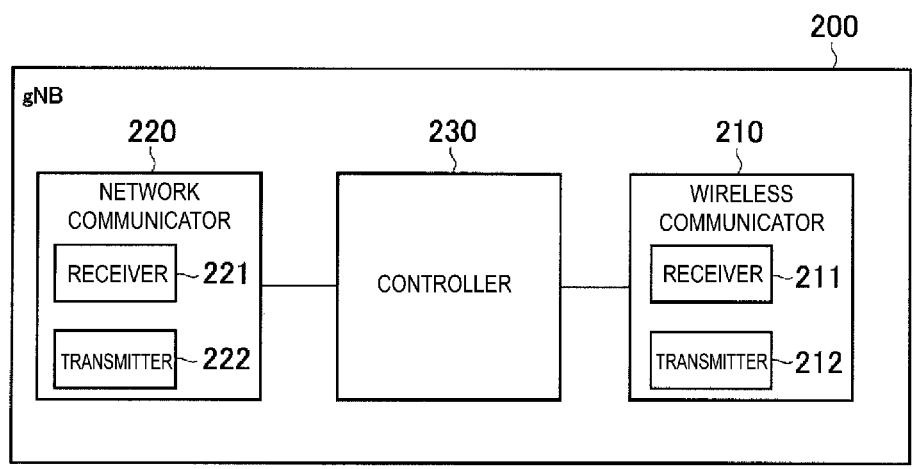
FIG. 2 is a diagram illustrating a configuration of a gNB according to an embodiment.

Now, a configuration of the gNB 200, corresponding to a base station according to an embodiment, will be described. FIG. 2 is a diagram illustrating a configuration of the gNB 200. As illustrated in FIG. 2, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various kinds of receptions under control of the controller 230. The receiver 211 includes an antenna and converts a radio signal received by the antenna into a baseband signal (received signal) and outputs the baseband signal to the controller 230. The transmitter 212 performs various kinds of transmissions under control of the controller 230. The transmitter 212 includes an antenna and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various kinds of receptions under control of the controller 230. The receiver 221 receives a signal from the outside and outputs the received signal to the controller 230. The transmitter 222 performs various kinds of transmissions under control of the controller 230. The transmitter 222 transmits a transmission signal output by the controller 230 to the outside.

The controller 230 performs various types of control for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation of a baseband signal, coding and decoding of the baseband signal, and the like. The CPU executes the programs stored in the memory to perform various types of processes. The processor executes processing of the layers described below.

Figure 3:
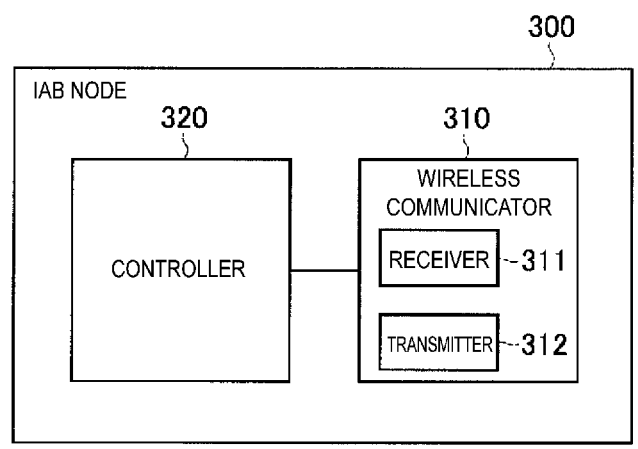
FIG. 3 is a diagram illustrating a configuration of an IAB node according to an embodiment.

Now, a configuration of the IAB node 300, used as a relay node according to an embodiment will be described. FIG. 3 is a diagram illustrating a configuration of the IAB node 300. As illustrated in FIG. 3, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. A wireless communicator 310 for BH link communication and a wireless communicator 310 for access link communication may be provided separately.

The wireless communicator 310 includes a receiver 311 and a transmitter 312. The receiver 311 performs various kinds of receptions under control of the controller 320. The receiver 311 includes an antenna and converts a radio signal received by the antenna into a baseband signal (received signal) and outputs the baseband signal to the controller 320. The transmitter 312 performs various kinds of transmissions under control of the controller 320. The transmitter 312 includes an antenna and converts a baseband signal (transmission signal) output by the controller 320 into a radio signal and transmits the radio signal from the antenna.

The controller 320 performs various types of control in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation of a baseband signal, coding and decoding of the baseband signal, and the like. The CPU executes the programs stored in the memory to perform various types of processes. The processor executes processing of the layers described below.

Figure 4:
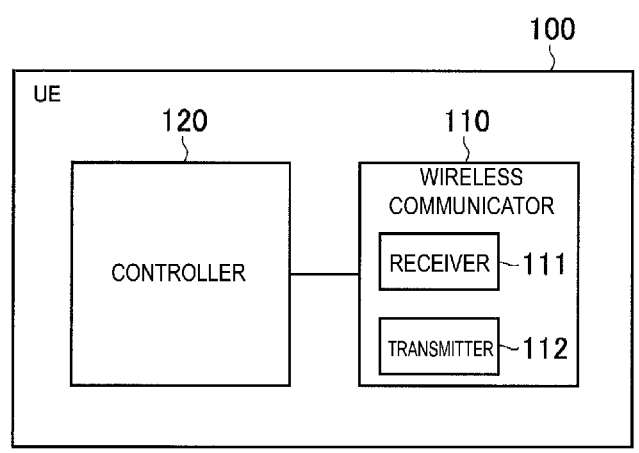
FIG. 4 is a diagram illustrating a configuration of a UE according to an embodiment.

Now, a configuration of the UE 100, corresponding to a user equipment according to an embodiment, will be described. FIG. 4 is a diagram illustrating a configuration of the UE 100. As illustrated in FIG. 4, the UE 100 includes a wireless communicator 110 and a controller 120.

The wireless communicator 110 performs wireless communication on the access link, in other words, wireless communication with the gNB 200 and wireless communication with the IAB node 300. The wireless communicator 110 may perform wireless communication on the side link, in other words, wireless communication with another UE 100. The wireless communicator 110 includes a receiver 111 and a transmitter 112. The receiver 111 performs various kinds of receptions under control of the controller 120. The receiver 111 includes an antenna and converts a radio signal received by the antenna into a baseband signal (received signal) and outputs the baseband signal to the controller 120. The transmitter 112 performs various kinds of transmissions under control of the controller 120. The transmitter 112 includes an antenna and converts a baseband signal (transmission signal) output by the controller 120 into a radio signal and transmits the radio signal from the antenna.

The controller 120 performs various kinds of control for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation of a baseband signal, coding and decoding of the baseband signal, and the like. The CPU executes the programs stored in the memory to perform various types of processes. The processor executes processing of the layers described below.

Figure 5:
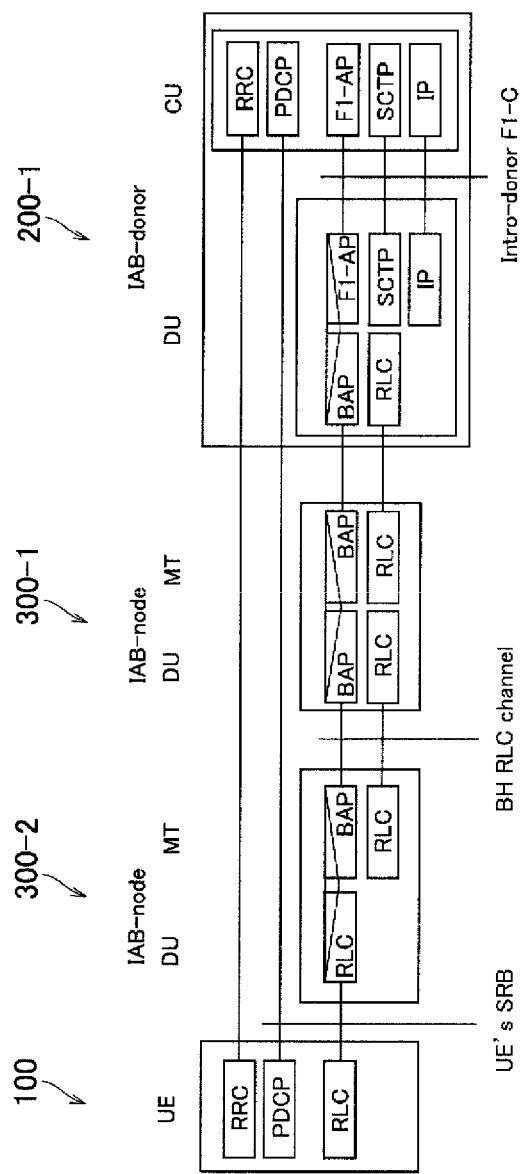
FIG. 5 is a diagram illustrating an example of a protocol stack in a mobile communication system according to an embodiment.
Figure 6:
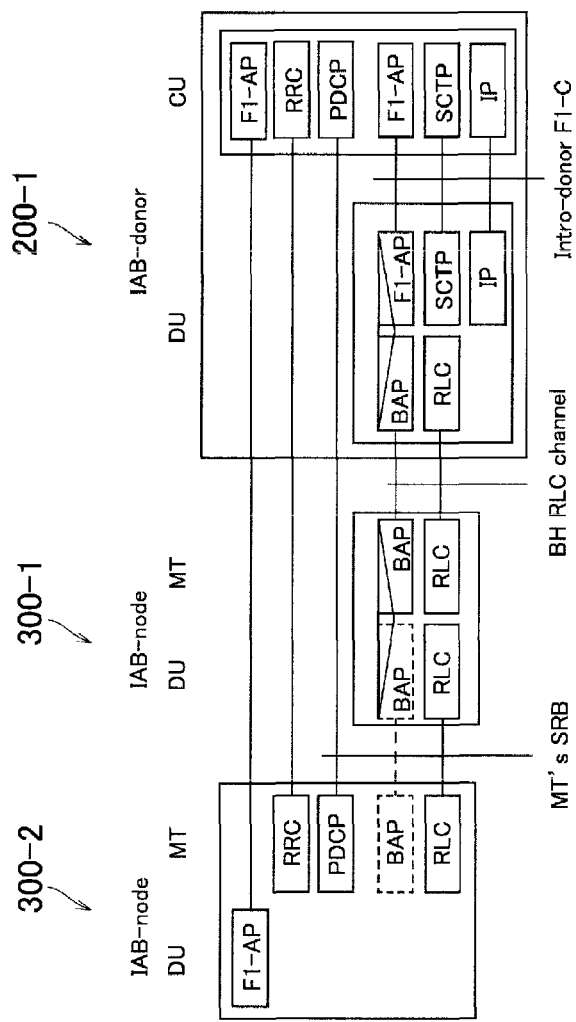
FIG. 6 is a diagram illustrating an example of a protocol stack in a mobile communication system according to an embodiment.

Now, an example of a protocol stack in the mobile communication system 1 according to an embodiment will be described. FIGS. 5 and 6 are diagrams illustrating an example of the protocol stack in the mobile communication system 1 according to an embodiment.

In FIGS. 5 and 6, illustration of the Medium Access Control (MAC) layer and the Physical layer (PHY), which are lower layers of the Radio Link Control (RLC) layer, is omitted. Note that the PHY layer is a layer that performs coding and decoding, modulation and demodulation, mapping and demapping of antennas, and mapping and demapping of resources. Data and control information are transmitted between the PHY layers via a physical channel. The MAC layer performs priority control of data, retransmission process through a hybrid ARQ (HARM), and the like. Data and control information are transmitted between the MAC layers via a transport channel. The MAC layer of the DU includes a scheduler. The scheduler executes scheduling processing to determine a transport format (a transport block size, a modulation and coding scheme (MCS)) for uplink and downlink, and an allocation resource block (allocation radio resource) for the UE 100.

As illustrated in FIG. 5, the donor gNB 200-1 is divided into the CU and the DU, and includes an F1-C interface (Intra-donor F1-C) between the CU and the DU. The Packet Data Convergence Protocol (PDCP) layer of the CU and the PDCP layer of the UE 100 communicate with each other via the IAB nodes 300-1 and 300-2. The PDCP layer is a layer that performs header compression and decompression, and encryption and decryption. The Radio Resource Control (RRC) layer of the CU and the RRC layer of the UE 100 communicate with each other via the IAB nodes 300-1 and 300-2. The RRC layer transmits RRC signaling for various configurations. The RRC layer controls the logical channel, the transport channel, and the physical channel in response to establishment, re-establishment, and release of the radio bearer. In a case where there is an RRC connection between the RRC layers, the UE 100 is in an RRC connected state. In a case where there is no RRC connection between the RRC layers, the UE 100 is in an RRC idle state.

In the DU and the MT, a Backhaul Adaptation Protocol (BAP) layer is provided as an upper layer of the RLC layer. The BAP layer is a layer that executes routing processing and bearer mapping and demapping processing. Note that the DUs of the UE 100 and the IAB node 300-2 include no BAP layer.

As illustrated in FIG. 6, the F1-Application Protocol (F1-AP) layer of the CU and the F1-AP layer of the DU of the IAB node 300-2 communicate with each other via the IAB node 300-1. The RRC layer of the CU and the RRC layer of the MT of the IAB node 300-2 communicate with each other via the IAB node 300-1. The PDCP layer of the CU and the PDCP layer of the MT of the IAB node 300-2 communicate with each other via the IAB node 300-1.

Note that although not illustrated in FIG. 6, the F1-AP layer of the CU and the F1-AP layer of the DU of the IAB node 300-1 communicate with each other. The RRC layer of the CU and the RRC layer of the MT of the IAB node 300-1 communicate with each other. The PDCP layer of the CU and the PDCP layer of the MT of the IAB node 300-1 communicate with each other.

Application Scenario for BH RLF Notification

Figure 7:
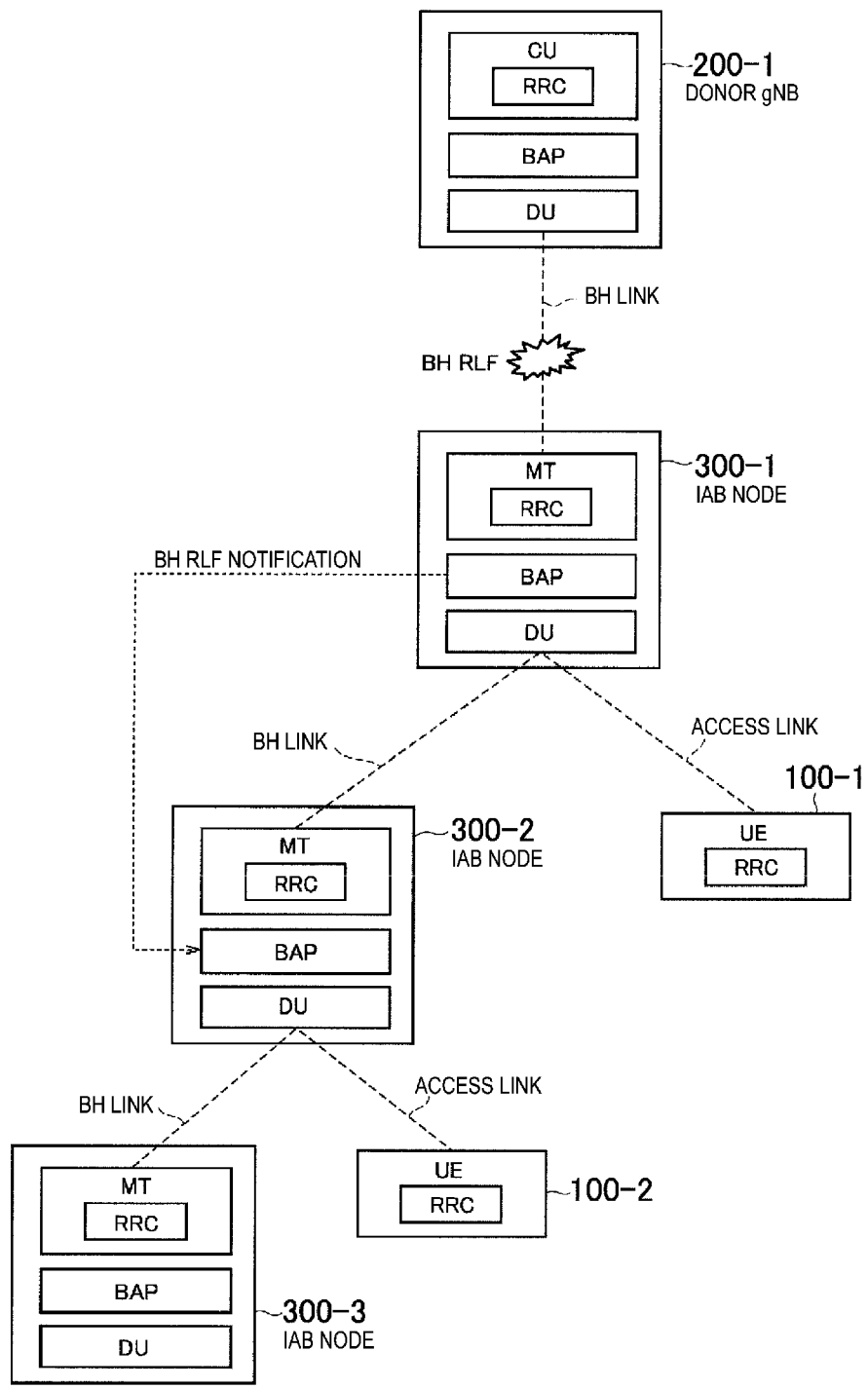
FIG. 7 is a diagram illustrating an application scenario for a BH RLF notification according to an embodiment.

Now, a BH link radio link failure (BH RLF) notification according to an embodiment will be described. FIG. 7 is a diagram illustrating an application scenario for the BH RLF notification according to an embodiment.

As illustrated in FIG. 7, the donor gNB 200-1 includes a CU, a BAP layer, and a DU. Each of IAB nodes 300-1 to 300-3 includes an MT, a BAP layer, and a DU.

Each of the CU, the MT, and the UE 100 includes the RRC layer. The RRC layer of the MT and the RRC layer of the UE 100 each transmit and receive, to and from the RRC layer of the CU, an RRC message corresponding to a message from the RRC layer. The CU manages and controls the IAB topology by using the RRC message. The CU may manage and control the IAB topology by using an F1 message corresponding to a message for the F1 protocol that is transmitted to and/or received from the DU.

FIG. 7 illustrates an example in which the MT of the IAB node 300-1 is connected wirelessly to the DU of the donor gNB 200-1 via an access link, the MT of the IAB node 300-2 is connected wirelessly to the DU of the IAB node 300-1 via an access link, and the MT of the IAB node 300-3 is connected wirelessly to the DU of the IAB node 300-2 via an access link.

FIG. 7 illustrates an example in which the UE 100-1 is connected wirelessly to the DU of IAB node 300-1 via an access link, and the UE 100-2 is connected wirelessly to the DU of IAB node 300-2 via an access link.

FIG. 7 illustrates an example in which the IAB node 300 is connected to one upper node via the BH link. However, the IAB node 300 may include dual connectivity to two upper nodes. One of the two upper nodes is a master node (MN), and the other is a secondary node (SN). The BH link between the IAB node 300 and the MN may be referred to as a Master Cell Group (MCG) link, and the BH link between the IAB node 300 and the SN may be referred to as a Secondary Cell Group (SCG) link.

In an embodiment, a case is assumed in which a BH RLF occurs. The MT detects a BH RLF, for example, as described below, and attempts BH link recovery to recover the BH link.

Firstly, in a case of detecting an out-of-synchronization state (out-of-sync) N310 consecutive times, the MT detects a radio problem and starts a timer T310. After starting the timer T310, the MT stops the timer T310 in a case of detecting an in-synchronization state (in-sync) N311 consecutive times.

Secondly, in a case where the timer T310 expires without stopping the timer T310, the MT detects an RLF and starts a timer T311 (in other words, initiates RRC re-establishment processing), and executes cell selection processing to recover the BH link. In a case that the cell selection processing is used to select an appropriate cell and the BH link for the cell selected is recovered, the MT stops the timer T311. The appropriate cell refers to a cell that meets at least a minimum radio quality standard.

Thirdly, in a case where the timer T311 expires without success in recovery of the BH link, the MT transitions to an RRC idle state. A failure in recovery from the BH RLF (in other words, expiration of the timer T311) following the detection of the BH RLF is hereinafter referred to as a failure in BH link recovery.

Note that when the IAB node 300 has dual connectivity, the MT separately detects BH RLFs in the MCG link and the SCG link. The failure in BH link recovery also includes a case in which the MT detects a BH RLF in both the MCG link and the SCG link and fails to recover from the BH RLF in both or one of the MCG link and the SCG link.

The BAP layer of the IAB node 300 transmits a notification message related to the BH RLF, to the BAP layer of the lower IAB node 300. The failure notification message is a message from the BAP layer. Such a failure notification message is hereinafter referred to as the "BH RLF notification".

For example, when receiving a BH RLF notification from the BAP layer of the upper IAB node 300, the BAP layer of the lower IAB node 300 notifies the reception to the MT of the lower IAB node 300, and the MT initiates processing for recovering the BH link, for example, RRC re-establishment processing. In a case of initiating the RRC re-establishment processing, the MT starts the timer T311 and executes cell selection processing to re-establish the BH link.

FIG. 7 assumes a case that the MT of the IAB node 300-1 detects a BH RLF with the donor gNB 200-1 used as the upper node and fails to recover the BH link. In an example described below, the upper node of the IAB node 300-1 is the donor gNB 200-1. However, the upper node of the IAB node 300-1 may be the upper IAB node 300.

In this case, the BAP layer of IAB node 300-1 transmits the BH RLF notification to the BAP layer of IAB node 300-2. However, the DU of the IAB node 300-1 maintains the cell without interruption. For example, the DU of the IAB node 300-1 continues to transmit a Synchronization Signal and PBCH block (SSB), corresponding to a downlink signal used for detecting and measuring the cell.

In such an application scenario, four types described below may be conceived as a type of BH RLF notification that the IAB node 300 transmits.

Type 1 (Plain notification): Indicates that the IAB node 300 has detected a BH RLF.

Type 2 (Trying to recover): Indicates that the IAB node 300 is attempting to recover the BH link.

Type 3 (BH link recovered): Indicates that the IAB node 300 has succeeded in recovering the BH link.

Type 4 (Recovery failure): Indicates that the IAB node 300 has failed to recover the BH link.

Here, in a case of detecting a BH RLF, the IAB node 300 attempts to recover the BH link, and thus type 2 can be integrated with type 1. Thus, in an embodiment, a BH RLF notification is introduced into which two types, type 1 and type 2, are integrated (hereinafter referred to as the "type 1/2 BH RLF notification"). In other words, the type 1/2 BH RLF notification indicates both that the IAB node 300 has detected a failure and that the IAB node 300 is attempting recovery. For example, the IAB node 300 transmits the type 1/2 BH RLF notification by using detection of a BH RLF as a trigger.

The IAB node 300 transmits the type 1 or type 2 BH RLF notification to the lower node, so that the lower node can execute predetermined processing to deal with the BH RLF. In other words, a communication control method according to an embodiment includes the following steps.

Firstly, the IAB node 300, which relays the communication between the lower node and the upper node, detects a failure (BH RLF) in the first radio link between the upper node and the IAB node 300.

Secondly, in response to detecting the BH RLF, the IAB node 300 transmits, to the lower node, a first notification (type 1/2 BH RLF notification) indicating that the BH RLF has been detected and attempts to recover the first radio link (BH link). The IAB node 300 may repeatedly transmit the type 1/2 BH RLF notification while attempting to recover the BH link. Note that, for saving of radio resources, the IAB node 300 preferably transmits the type 1/2 BH RLF notification only once in response to the detection of a BH RLF.

Thirdly, the lower node executes predetermined processing in a state of maintaining the second radio link with the IAB node 300 (in other words, the RRC connected state in the cell of the IAB node 300) until a predetermined time period elapses after the reception of the first notification (type 1/2 BH RLF notification) from the IAB node 300. The predetermined time period corresponds to the time period for waiting for the recovery of the BH link, and is, for example, either 1) the time period until the timer expires after the reception of the first notification from the IAB node 300 or 2) the time period after reception of the first notification from the IAB node 300 and before reception of a type 3 or type 4 BH RLF notification.

The predetermined processing executed by the lower node within the predetermined time period includes at least one of first processing for stopping transmission from the lower node to the IAB node 300, second processing for performing Pre-measurement on a node other than the IAB node 300, and third processing for inquiring of the target node other than the IAB node 300 whether the radio link with the lower node can be established.

Here, the first processing may include processing for stopping transmission of a scheduling request (SR) from the lower node to the IAB node 300. The second processing may include processing for performing radio measurement for cell selection in advance as preparation for the RRC re-establishment processing. The third processing will be described in detail below.

Operation Pattern 1

Figure 8:
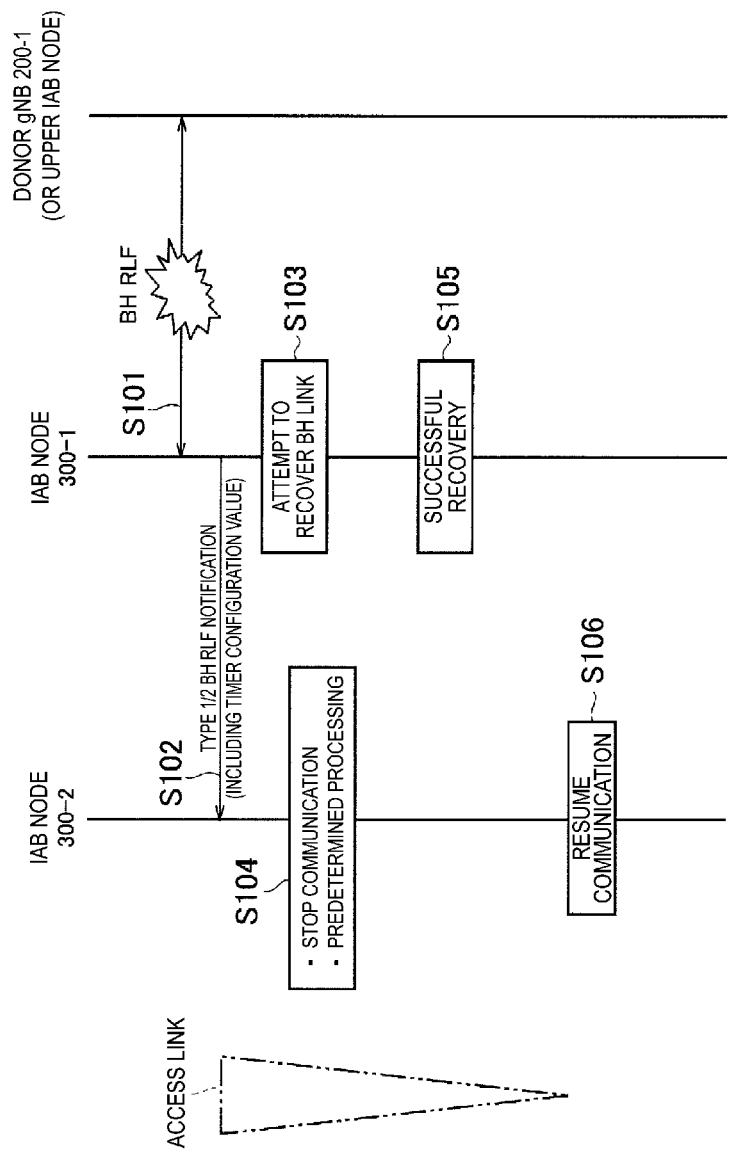
FIG. 8 is a diagram illustrating an operation pattern 1 according to an embodiment.
Figure 9:
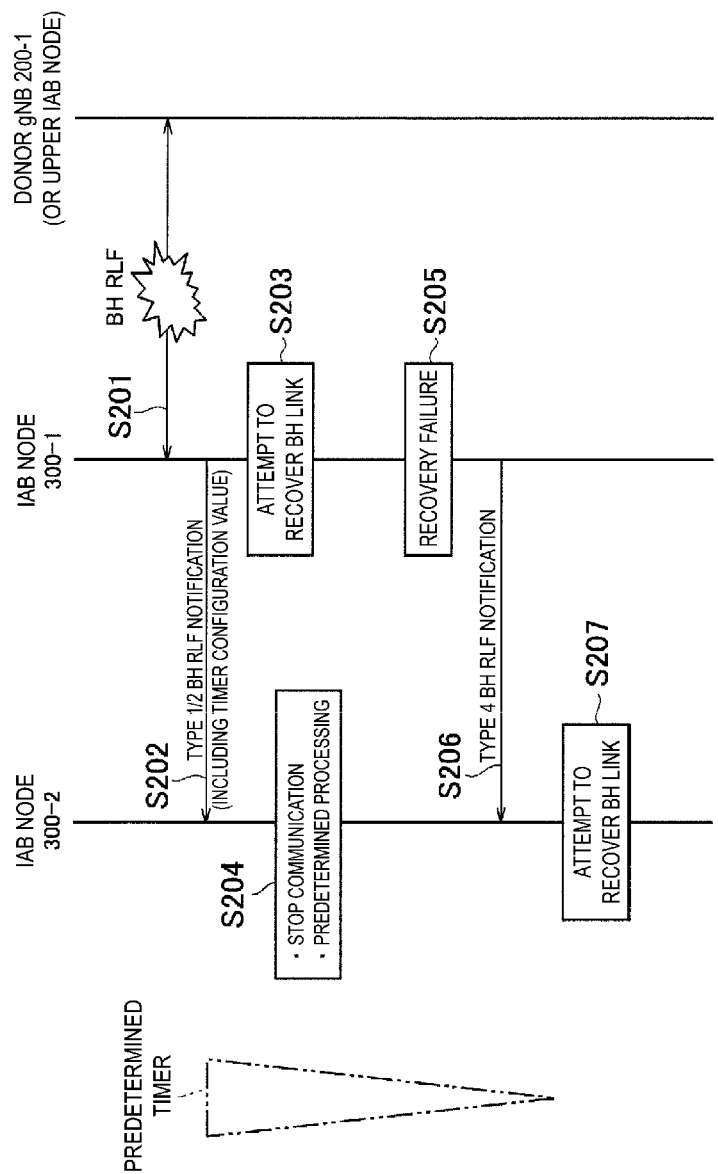
FIG. 9 is a diagram illustrating the operation pattern 1 according to an embodiment.

Now, the operation pattern 1 according to an embodiment will be described. FIGS. 8 and 9 are diagrams illustrating the operation pattern 1 according to an embodiment. In the operation pattern 1, as the BH RLF notification, two notifications, the type 1/2 BH RLF notification and type 4 BH RLF notification, are used.

FIG. 8 is an operation example in which the IAB node 300-1 is assumed to detect a BH RLF and then to succeed in recovering the BH link.

As illustrated in FIG. 8, in step S101, the MT of the IAB node 300-1 detects a BH RLF with the donor gNB 200-1 corresponding to the upper node of the IAB node 300-1. Note that the upper node of the IAB node 300-1 may be the upper IAB node 300 instead of the donor gNB 200-1.

In step S102, in response to detection of the BH RLF in step S101, the BAP layer of the IAB node 300-1 transmits the type 1/2 BH RLF notification to the IAB node 300-2. In the operation pattern 1, the type 1/2 BH RLF notification is transmitted that includes configuration information specifying a predetermined time period (hereinafter referred to as the "timer configuration value").

When the IAB node 300-2 receives the type 1/2 BH RLF notification, the timer configuration value is shared between the IAB nodes 300-1 and 300-2. When the BAP layer of the IAB node 300-2 receives the type 1/2 BH RLF notification, the MT of the IAB node 300-2 acquires the timer configuration value included in the type 1/2 BH RLF notification, and starts a predetermined timer configured with this timer configuration value.

In step S103, in response to detection of the BH RLF, the MT of the IAB node 300-1 attempts to recover the BH link (for example, initiates the RRC re-establishment processing).

In step S104, while the predetermined timer is running, the MT of the IAB node 300-2 stops communication with the IAB node 300-1 and executes predetermined processing. The predetermined processing includes at least one of first processing for stopping transmission from the IAB node 300-2 to the IAB node 300-1, second processing for performing radio measurement on a node other than the IAB node 300-1, and third processing for inquiring of the target node other than the IAB node 300-1 whether the radio link with the IAB node 300-2 can be established.

In step S105, the MT of the IAB node 300-1 succeeds in the RRC re-establishment processing (in other words, succeeds in recovering the BH link).

In step S106, the MT of the IAB node 300-2 detects that the predetermined timer has expired (in other words, the predetermined time period has elapsed), and resumes communication with the IAB node 300-2. In this way, the MT of the IAB node 300-2 is allowed for transmission to the IAB node 300-1.

FIG. 9 is an operation example in which the IAB node 300-1 is assumed to detect a BH RLF and then to fail to recover the BH link.

As illustrated in FIG. 9, operations in steps S201 to S204 are similar to the corresponding operations in FIG. 8.

In step S205, the MT of the IAB node 300-1 fails in the RRC re-establishment processing (in other words, fails to recover the BH link).

In step S206, in response to the failure in the recovery of the BH link in step S205, the BAP layer of IAB node 300-1 transmits the type 4 BH RLF notification to the IAB node 300-2.

In step S207, in response to receiving the type 4 BH RLF notification from the IAB node 300-1 before the predetermined timer expires, the MT of the IAB node 300-2 attempts to recover the BH link of the IAB node 300-2 (e.g., initiates the RRC re-establishment processing). In the description below, an example is mainly described in which the MT of the IAB node 300-2 uses the RRC re-establishment processing in the attempt to recover the BH link. Note that, during the time of multi-connectivity when the IAB node 300-2 connects to a plurality of upper nodes, the MT of the IAB node 300-2 may attempt to recover the BH link by using transmission processing for an MCG failure indication or an SCG failure indication.

In this manner, according to the operation pattern 1, by introducing the predetermined timer, the IAB node 300-2 can resume communication with the IAB node 300-1 without transmission of the type 3 BH RLF notification by the IAB node 300-1. This allows saving of radio resources for transmitting the type 3 BH RLF notification. The IAB node 300-1 specifies a timer configuration value for the predetermined timer, so that the appropriate timer configuration value can be used.

Operation Pattern 2

Now, the operation pattern 2 according to an embodiment will be described. In the operation pattern 2, the type 1/2 BH RLF notification and the type 3 BH RLF notification are made common. One BH RLF notification into which types 1 to 3 are integrated is referred to as a type 1/2/3 BH RLF notification. Note that the operation pattern 2 may be used in conjunction with the operation pattern 1.

The type 1/2 BH RLF notification and the type 3 BH RLF notification are made common, so that the total number of types of BH RLF notifications can be reduced, enabling a reduction in the bit length of type identification information for identifying the type of BH RLF notification. For example, in a case where only two notifications: the type 1/2/3 BH RLF notification and the type 4 BH RLF notification are defined in the system specifications, the type identification information included in the BH RLF notification needs only one bit ("0" or "1").

In the operation pattern 2, the BAP layer of the IAB node 300-1 transmits the type 1/2/3 BH RLF notification of the first time (first notification) when a BH RLF is detected and transmits the type 1/2/3 BH RLF notification of the second time (second notification) when the BH link is recovered. In a case where the IAB node 300-2, corresponding to the lower node, receives the first notification from the IAB node 300 and then receives the second notification from the IAB node 300, the IAB node 300 is considered to have successfully recovered the BH link.

Figure 10:
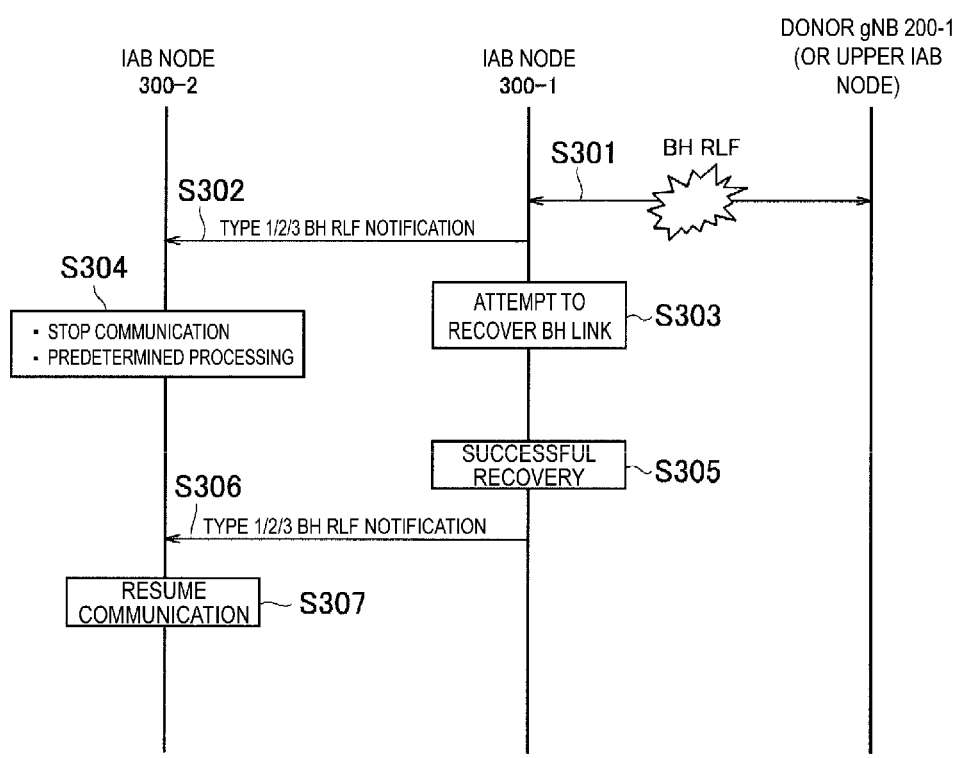
FIG. 10 is a diagram illustrating an operation pattern 2 according to an embodiment.

FIG. 10 is a diagram illustrating the operation pattern 2 according to an embodiment. Operations similar to those in the operation pattern 1 will not be described.

As illustrated in FIG. 10, in step S301, the MT of the IAB node 300-1 detects a BH RLF with the donor gNB 200-1 corresponding to the upper node of the IAB node 300-1. Note that the upper node of the IAB node 300-1 may be the upper IAB node 300 instead of the donor gNB 200-1.

In step S302, in response to detection of the BH RLF in step S301, the BAP layer of the IAB node 300-1 transmits the type 1/2/3 BH RLF notification to the IAB node 300-2. In response to receiving the type 1/2/3 BH RLF notification of the first time, the IAB node 300-2 considers that the IAB node 300-1 has detected the BH RLF and is recovering the BH link.

In step S303, in response to detection of the BH RLF, the MT of the IAB node 300-1 attempts to recover the BH link (for example, initiates the RRC re-establishment processing).

In step S304, the MT of the IAB node 300-2 stops communicating with the IAB node 300-1 and executes the predetermined processing.

In step S305, the MT of the IAB node 300-1 succeeds in the RRC re-establishment processing (in other words, succeeds in recovering the BH link).

In step S306, in response to the successful recovery of the BH link in step S305, the BAP layer of the IAB node 300-1 transmits the type 1/2/3 BH RLF notification to the IAB node 300-2. In response to receiving the type 1/2/3 BH RLF notification of the second time, the IAB node 300-2 considers that the BH link of IAB node 300-1 has been recovered.

In step S307, the MT of the IAB node 300-2 resumes communication with the IAB node 300-1. In this way, the MT of the IAB node 300-2 is allowed for transmission to the IAB node 300-1.

Operation Pattern 3

Now, the operation pattern 3 according to an embodiment will be described. The operation pattern 3 is an operation pattern using the third processing described above. The operation pattern 3 may be used in conjunction with the operation pattern 1 or 2.

As described above, the IAB node 300-2, used as the lower node, inquires, in the third processing, of the target node other than the IAB node 300-1 whether any radio link with the IAB node 300-2 can be established. The target node may be the gNB 200 (DU) or may be the IAB node 300.

Such an inquiry allows pre-recognition of whether the target node accepts connection to the IAB node 300-2. This enables a radio link with the target node to be quickly established even in a case where the IAB node 300-1 fails to recover the BH link.

Specifically, in a case where the target node does not accept the RRC re-establishment request from the IAB node 300-2 after the IAB node 300-1 fails to recover the BH link, a delay occurs in the recovery of the BH link performed by the IAB node 300-2. Such a delay also adversely affects the lower node of the IAB node 300-2. However, by pre-recognizing whether the target node accepts connection to the IAB node 300-2, the target node prevented from being connected can be excluded and the BH link of the IAB node 300-2 can be recovered, allowing such a delay to be suppressed.

The third processing includes processing for transmitting a request message from the IAB node 300-2 to the target node, the request message requesting preparation for establishment of the radio link between the IAB node 300-2 and the target node, and processing in which the IAB node 300-2 receives, from the target node, a response message indicating whether the request message is accepted.

Such a request message and a response message may each be, for example, an RRC message, a MAC CE, a message from the BAP layer, or a signal from the physical layer (e.g., a random access preamble), but hereinafter, the use of RRC messages is primarily assumed. The request message may be referred to as an "RRC Pre-connection Request", and the response message may be referred to as an "RRC Pre-connection".

In a case where a first time period elapses or the IAB node 300-1 fails to recover the BH link after the IAB node 300-2 receives the response message indicating that the request message has been accepted, then a radio link with the target node is established. This allows the BH link of the IAB node 300-2 to be quickly recovered.

On the other hand, in a case where a second time period elapses or the IAB node 300-1 succeeds in recovery of the BH link after the IAB node 300-2 receives the response message indicating that the request message has been accepted, then the target node is notified that no radio link with the target node is to be established. This allows release of radio resources and the like prepared for the IAB node 300-2 by the target node.

Figure 11:
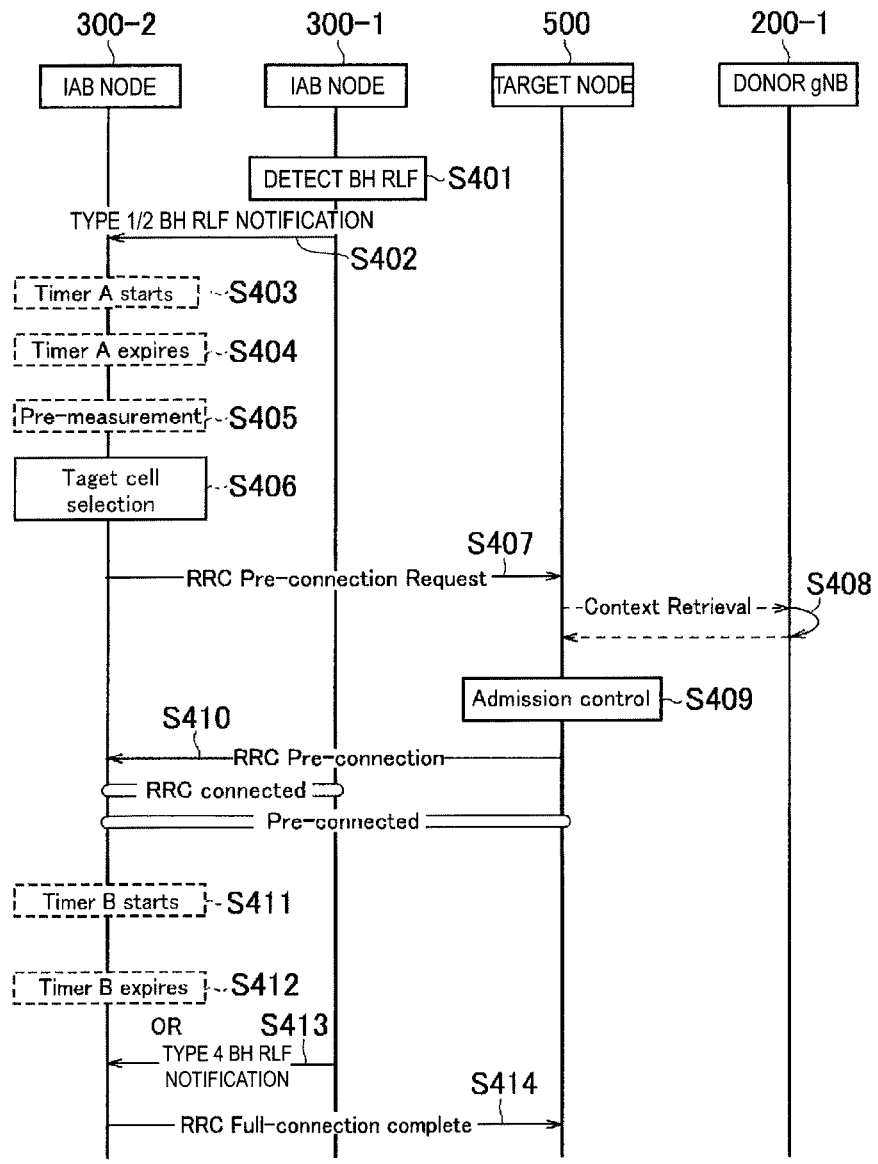
FIG. 11 is a diagram illustrating an operation pattern 3 according to an embodiment.
Figure 12:
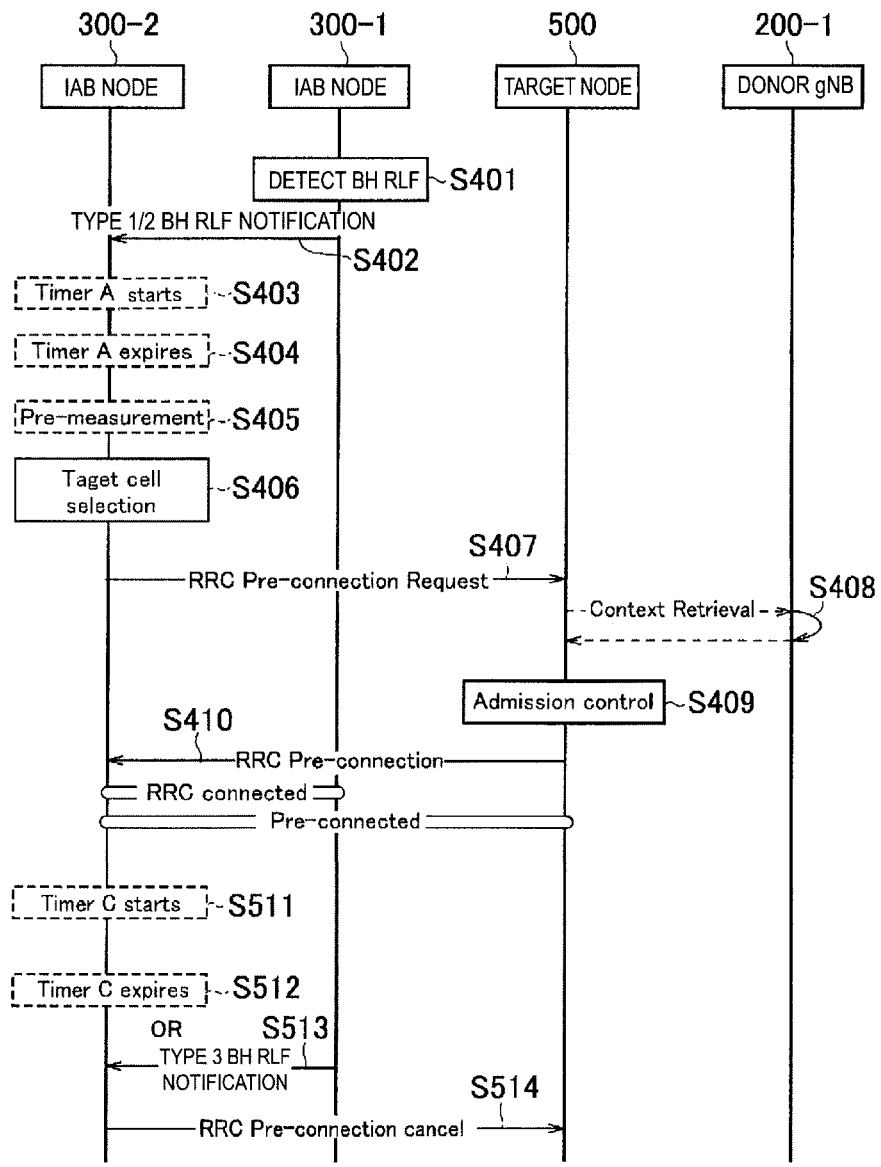
FIG. 12 is a diagram illustrating the operation pattern 3 according to an embodiment.

FIGS. 11 and 12 are diagrams illustrating the operation pattern 3 according to an embodiment. In FIGS. 11 and 12, optional steps are represented by dashed lines.

FIG. 11 is an operation example in which the IAB node 300-1 is assumed to detect a BH RLF and then to fail to recover the BH link.

As illustrated in FIG. 11, in step S401, the MT of the IAB node 300-1 detects a BH RLF with the donor gNB 200-1 corresponding to the upper node of the IAB node 300-1. Note that the upper node of the IAB node 300-1 may be the upper IAB node 300 instead of the donor gNB 200-1.

In step S402, in response to detection of the BH RLF in step S401, the BAP layer of the IAB node 300-1 transmits the type 1/2 BH RLF notification (or type 1/2/3 BH RLF notification) to the IAB node 300-2. The BAP layer of the IAB node 300-2 receives the BH RLF notification.

In step S403, in response to receiving the BH RLF notification in step S402, the MT of the IAB node 300-2 starts a Timer A for determining a timing for initiating Pre-measurement. A timer configuration value for the Timer A may be configured for the IAB node 300-2 by the IAB node 300-1 or the donor gNB 200-1, or may be included in the BH RLF notification.

In step S404, the MT of the IAB node 300-2 detects expiration of the Timer A.

In step S405, in response to expiration of the Timer A, the MT of the IAB node 300-2 performs radio measurement. For example, the MT of the IAB node 300-2 measures radio quality of a cell other than the cell of the IAB node 300-1 corresponding to the current serving cell. Note that the operations in steps S403 to S405 are optional.

In step S406, the MT of the IAB node 300-2 selects a target node 500 (target cell). For example, the MT of the IAB node 300-2 selects a cell satisfying at least the minimum radio quality standard as a target cell based on a measurement result in step S405. Alternatively, the target cell selected may be configured in the IAB node 300-2 in advance. For example, a target cell list from the upper node may be configured in advance. The list may include information regarding selection priority for each cell. The MT of the IAB node 300-2 may execute selection processing by using both the radio quality standard and the target cell list.

In step S407, the MT of the IAB node 300-2 transmits an RRC Pre-connection Request to the target node 500. The MT of the IAB node 300-2 may transmit the RRC Pre-connection Request during a procedure of random access to the target node 500.

The RRC Pre-connection Request includes identification information identifying the IAB node 300-2 (MT). The RRC Pre-connection Request may include Cause information indicating the cause of transmission of the RRC Pre-connection Request. For example, the MT of the IAB node 300-2 includes information indicating that the BH RLF of the IAB node 300-1 is the cause of the transmission, in the RRC Pre-connection Request as the Cause information.

The RRC Pre-connection Request may be a message having the same format as that of an existing RRC message (e.g., RRC Reestablishment Request, RRC Setup Request, or RRC Resume Request). In this case, the RRC Pre-Connection Request may include an identifier indicating a "pre-connection request".

Before transmitting the RRC Pre-connection Request to the target node 500, the MT of the IAB node 300-2 may confirm that the target node 500 has a function of handling the RRC Pre-connection Request, and after the confirmation, the MT of the IAB node 300-2 may transmit the RRC Pre-connection Request to the target node 500. For example, the target node 500 notifies the presence or absence of the function by broadcasting system information containing the presence or absence of the function.

In step S408, in response to receiving the RRC Pre-connection Request, the target node 500 requests the CU of the donor gNB 200-1 to transmit a UE context and acquires the UE context. The UE context includes information indicating various configurations and communication capabilities for the IAB node 300-2 (MT). The UE context preferably includes information of a Bearer Context (maximum throughput and the like). Note that the operation in step S408 is optional.

In step S409, based on at least one of the RRC Pre-connection Request received in step S407 and the UE context acquired in step S408, the target node 500 determines whether to accept the RRC Pre-connection Request (in other words, whether to accept the Pre-connection). For example, the target node 500 determines whether a load resulting from acceptance of the IAB node 300-2 is allowable based on the information of the Bearer Context (maximum throughput and the like) included in the UE context.

Here, the description below assumes that the target node 500 determines to accept the RRC Pre-connection Request. Note that in a case of determining not to accept the RRC Pre-connection Request, the target node 500 may transmit, to the IAB node 300-2, a message indicating rejection, or may avoid returning a response to the IAB node 300-2.

In step S410, the target node 500 transmits, to the IAB node 300-2, RRC Pre-connection indicating that the target node 500 accepts the RRC Pre-connection Request. The target node 500 may transmit RRC Pre-connection to the IAB node 300-2 during the random access procedure.

The RRC Pre-connection may include an identifier indicating any one of RRC Reestablishment, RRC Setup, and RRC Resume. For example, in a case where the target node 500 successfully acquires the UE context, the target node 500 includes, in RRC Pre-connection, the identifier indicating that RRC Reestablishment is possible. On the other hand, in a case where the target node 500 fails to acquire the UE context, the target node 500 includes, in RRC Pre-connection, the identifier indicating RRC Setup.

The RRC Pre-connection may include configuration information related to radio configurations for the IAB node 300-2 or may include a temporary identifier (pre-connection ID) allocated to the IAB node 300-2.

In response to receiving RRC Pre-connection, the MT of the IAB node 300-2 determines that a radio link with the target node 500 can be established. In a case where the configuration information of radio configurations is included in RRC Pre-connection, the configuration information is stored, and subsequently the configuration information is applied when communication with the target node 500 is actually initiated. In response to receiving RRC Pre-connection, the MT of the IAB node 300-2 may be brought into an RRC inactive state for the target node 500. Note that, the MT of the IAB node 300-2 remains in the RRC connected state via the IAB node 300-1.

In step S411, the MT of the IAB node 300-2 starts a Timer B in response to receiving RRC Pre-connection. A timer configuration value for the Timer B may be configured for the IAB node 300-2 by the IAB node 300-1 or the donor gNB 200-1, or may be included in RRC Pre-connection.

In step S412, the MT of the IAB node 300-2 detects expiration of the Timer B.

Alternatively, in step S413, the BAP layer of the IAB node 300-2 receives the type 4 BH RLF notification from the IAB node 300-1.

In step S414, in response to expiration of the Timer B in step S412, or in response to reception of the type 4 BH RLF notification in step S413, the MT of the IAB node 300-2 establishes a radio link (BH link) with the target node 500. For example, the MT of the IAB node 300-2 transmits, to the target node 500, a message (RRC Full-connection complete) indicating being brought into the RRC connected state.

The RRC Full-connection complete may be an existing RRC message (e.g., RRC Reestablishment Complete, RRC Setup Complete, or RRC ResumeComplete). As a result, the MT of IAB node 300-2 releases the RRC connection via the IAB node 300-1.

RRC Full-connection complete may include an identifier allocated by the target node 500 (pre-connection ID).

Note that, in a case where the Timer B expires (step S412), the MT of the IAB node 300-2 may consider that RRC connection to the target node 500 has been established (re-established) without transmitting RRC Full-connection complete to the target node 500.

FIG. 12 is an operation example in which the IAB node 300-1 is assumed to detect a BH RLF and then to succeed in recovering the BH link.

As illustrated in FIG. 12, operations in steps S401 to S410 are similar to the corresponding operations in FIG. 11.

In step S511, the MT of the IAB node 300-2 starts a Timer C in response to receiving RRC Pre-connection. A timer configuration value for the Timer C may be configured for the IAB node 300-2 by the IAB node 300-1 or the donor gNB 200-1 or may be included in RRC Pre-connection.

In step S512, the MT of the IAB node 300-2 detects expiration of the Timer C.

Alternatively, in step S513, the BAP layer of the IAB node 300-2 receives the type 3 BH RLF notification (or the type 1/2/3 BH RLF notification) from the IAB node 300-1.

In step S514, in response to expiration of the Timer C in step S512, or in response to reception of the type 3 BH RLF notification in step S513, the MT of the IAB node 300-2 transmits, to the target node 500, a message indicating that no radio link with the target node 500 is to be established (RRC Pre-connection cancel). In this case, the target node 500 discards the UE context, and the MT of the IAB node 300-2 discards the radio configuration information.

RRC Pre-connection cancel may include an identifier allocated by the target node 500 (pre-connection ID).

Note that in a case where the Timer C expires (step S512), the MT of the IAB node 300-2 may consider that the pre-connection with the target node 500 is discarded without transmitting RRC Pre-connection cancel to the target node 500.

Operation Pattern 4

Now, the operation pattern 4 according to an embodiment will be described. The operation pattern 4 is an operation pattern using conditional handover. The operation pattern 4 may be used in conjunction with any of the operation patterns 1 to 3.

Unlike for typical handover for which execution of the handover is determined by the gNB 200 (CU), for the conditional handover, execution of the handover is determined by the MT of the IAB node 300-2. Specifically, conditions for executing the handover are configured in advance for the RRC layer of the MT of the IAB node 300-2 by the RRC layer of the CU. The RRC layer of the MT of the IAB node 300-2 suspends the handover until the configured conditions are satisfied. The conditions include the condition that the type 4 BH RLF notification is received from the upper node.

In other words, in the operation pattern 4, in a case where conditional handover from the IAB node 300-1 to another upper node is configured for the IAB node 300-2, the MT of the IAB node 300-2 suspends the handover to such another upper node until the handover conditions for such another upper node are satisfied. In response to receiving the type 4 BH RLF notification from the IAB node 300-1, the MT of the IAB node 300-2 executes handover based on the configured conditional handover.

In a case where such conditional handover is used, the gNB 200 (CU) corresponding to the upper node preferably configures conditional handover for the IAB node 300-2 in view of the radio quality between the hops on the multi-hop path.

Figure 13:
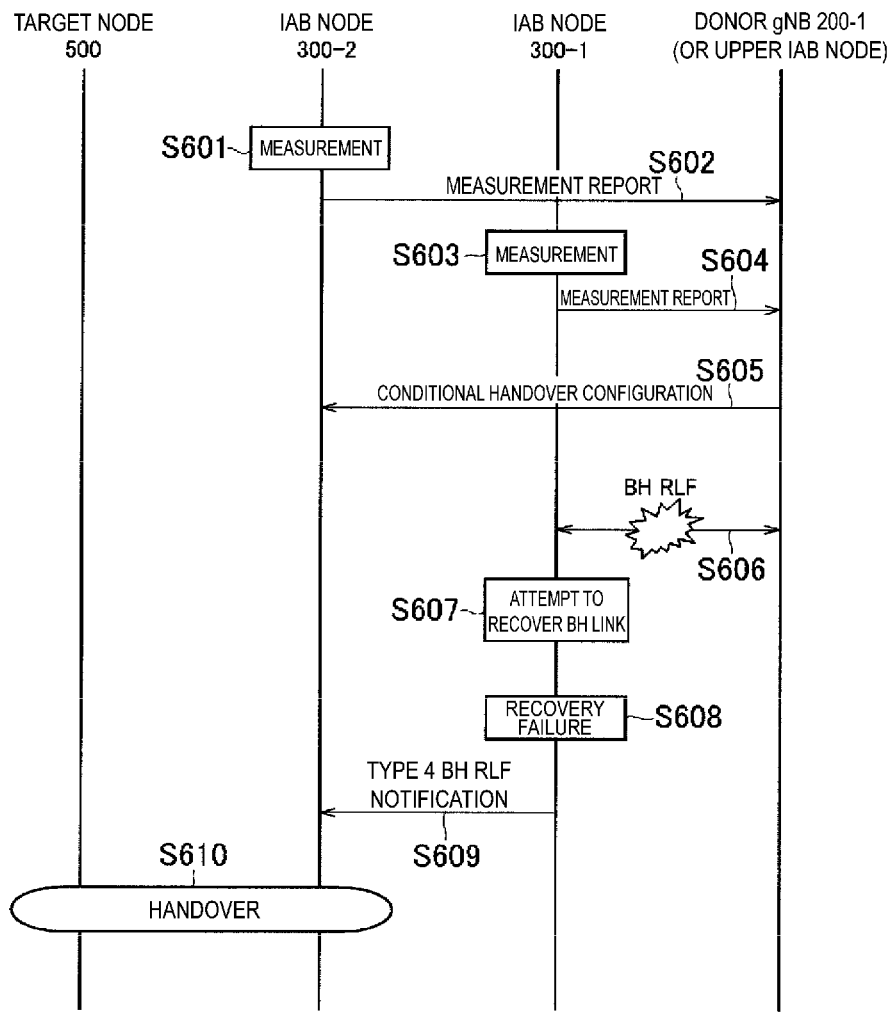
FIG. 13 is a diagram illustrating an operation pattern 4 according to an embodiment.

FIG. 13 is a diagram illustrating the operation pattern 4 according to an embodiment. In FIG. 13, the handover destination of the conditional handover (target node 500) may be the IAB node 300 or may be the gNB 200.

As illustrated in FIG. 13, in step S601, the MT of the IAB node 300-2 performs radio measurement. The radio measurement is processing for measuring the radio quality (e.g., received power of a reference signal) of one or a plurality of cells detected by the MT of IAB node 300-2. The one or plurality of cells include a cell of the IAB node 300-1 corresponding to the serving cell of the MT of the IAB node 300-2.

In Step S602, the MT of the IAB node 300-2 transmits, to the donor gNB 200-1 via the IAB node 300-1, a measurement report corresponding to an RRC message indicating a measurement result in step S601. The measurement report includes a set of the radio quality and cell identifier for each cell.

In step S603, the MT of the IAB node 300-1 performs radio measurement. The radio measurement is processing for measuring the radio quality (e.g., received power of the reference signal) of one or a plurality of cells detected by the MT of IAB node 300-1. The one or plurality of cells include a cell of the donor gNB 200-1 corresponding to the serving cell of the MT of the IAB node 300-1.

In step S604, the MT of the IAB node 300-1 transmits, to the donor gNB 200-1, a measurement report corresponding to an RRC message indicating a measurement result in step S603. The measurement report includes a set of the radio quality and cell identifier for each cell.

In step S605, based on the measurement report received in step S602 and the measurement report received in step S604, the CU of the donor gNB 200-1 transmits, to the IAB node 300-2 via the IAB node 300-1, a message including configuration information for the conditional handover. The message is assumed to be an RRC message but may be an F1 message.

Here, the CU of the donor gNB 200-1 configures conditional handover for the IAB node 300-2 in view of the radio quality between the IAB node 300-1 and the donor gNB 200-1 as well as the radio quality between the IAB node 300-2 and the IAB node 300-1. For example, even when the radio quality between the IAB node 300-2 and the IAB node 300-1 is favorable, the CU of the donor gNB 200-1 configures conditional handover for the IAB node 300-2 in a case where the radio quality between the IAB node 300-1 and the donor gNB 200-1 is degraded.

The configuration of conditional handover includes a list of candidates for the handover destination (e.g., a list of cell identifiers) and condition information for configuring conditions for the handover. Separate condition information may be configured for each candidate in the list. For example, the condition information includes information indicating a first condition related to radio quality and information indicating a second condition for the BH RLF.

The first condition may include a threshold value for comparing the radio quality of the current serving cell and/or the radio quality of the cell of a candidate for the handover destination. The radio quality is any measurement value indicating how favorable the radio state is. The radio quality may be, for example, Reference Signal Received Power (RSRP) and/or Reference Signal Received Quality (RSRQ).

The second condition includes the condition that the type 4 BH RLF notification is received from the upper node. In a case that the IAB node 300 has dual connectivity to two upper nodes, the second condition may include the condition that the type 4 BH RLF notification has been received from both of the two upper nodes. The second condition may include the condition that the IAB node 300 detects a BH RLF in the BH link of the IAB node 300 and fails to recover from the BH RLF.

The MT of the IAB node 300-2 stores the list and the condition information included in conditional handover configurations from the donor gNB 200-1. The MT of the IAB node 300-2 starts determination process for determining whether the condition indicated by the stored condition information is satisfied.

In step S606, the MT of the IAB node 300-1 detects a BH RLF with the donor gNB 200-1 corresponding to the upper node of the IAB node 300-1. The upper node of the IAB node 300-1 may be the upper IAB node 300 instead of the donor gNB 200-1.

In step S607, in response to detection of the BH RLF, the MT of the IAB node 300-1 performs the RRC re-establishment processing to recover the BH link. Here, it is assumed that the MT of the IAB node 300-1 fails in the RRC re-establishment processing (in other words, fails to recover the BH link) (step S608).

In step S609, the BAP layer of the IAB node 300-1 transmits the type 4 BH RLF notification to the IAB node 300-2. The BAP layer of the IAB node 300-2 notifies the MT of the IAB node 300-2 of reception of the type 4 BH RLF notification from the IAB node 300-1.

In step S610, in response to receiving the type 4 BH RLF notification, the MT of the IAB node 300-2 determines that the conditions for the conditional handover are satisfied and executes handover on the target node 500 corresponding to the conditions.

OTHER EMBODIMENTS

In the embodiment described above, an example is described in which the BH RLF notification is a message from the BAP layer. The BH RLF notification may be a message from the MAC layer (MAC control element). In a case where the BH RLF notification includes MAC control elements, the UE 100 not including the BAP layer can also receive the BH RLF notification. Thus, the lower node receiving the BH RLF notification is not limited to the lower IAB node 300 and may be the UE 100.

In the embodiment described above, an example is described in which the UE 100 does not include the BAP layer; however, the UE 100 may include the BAP layer. The UE 100 including the BAP layer can receive the BH RLF notification transmitted by the BAP layer of the IAB node 300.

Figure 14:
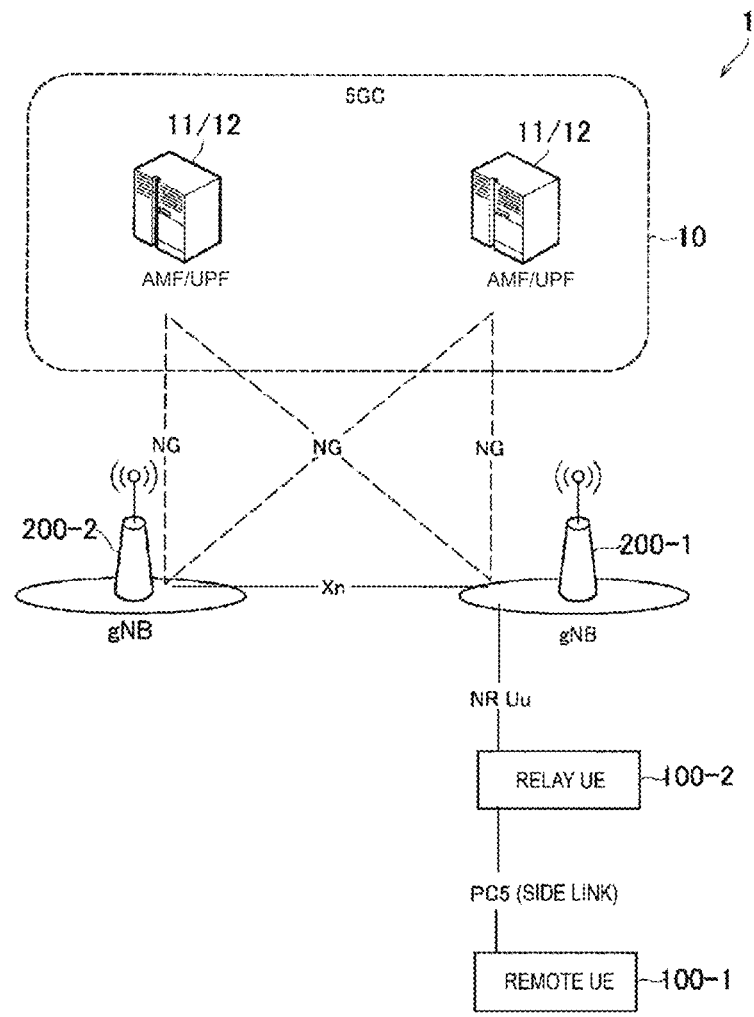
FIG. 14 is a diagram illustrating a changed example of a mobile communication system.

In the embodiment described above, an example is described in which the relay node is the IAB node 300. The relay node may be a relay UE. FIG. 14 is a diagram illustrating a changed example of the mobile communication system 1. As illustrated in FIG. 14, the mobile communication system 1 includes a 5GC 10, gNBs 200-1 and 200-2, a remote UE 100-1, and a relay UE 100-2. The relay UE 100-2 is an example of a relay node. The remote UE 100-1 is an example of a lower node, and the gNB 200-1 is an example of an upper node. The remote UE 100-1 communicates with the relay UE 100-2 via a PC5 interface (side link) corresponding to an inter-UE interface. The relay UE 100-2 communicates with the gNB 200-1 via an NR Uu wireless interface. As a result, the remote UE 100-1 communicates indirectly with the gNB 200-1 via the relay UE 100-2.

The operation in the operation pattern 3 described above may be applied to a scenario with no relay node present. For example, the UE 100 in the RRC idle state may perform each of steps S406 and S407 in FIG. 12. Thus, in response to the operation of the target node 500 in step S410, the UE 100 in the RRC idle state can recognize whether the UE 100 can connect to the target node 500 before the UE 100 actually establishes connection to the target node 500. For example, the operation in the operation pattern 3 is effective in a case where an industrial UE or the like that inevitably needs to establish connection at a certain timing is to transition from the RRC idle state to the RRC connected state.

In the embodiments described above, an example has been mainly described, in which the mobile communication system 1 is a 5G mobile communication system. However, the base station in the mobile communication system 1 may be an eNB used as an LTE base station. The core network in the mobile communication system 1 may be an Evolved Packet Core (EPC). Furthermore, the gNB can also be connected to the EPC, the eNB can also be connected to the 5GC, and the gNB and the eNB can also be connected via an inter-base station interface (Xn interface, X2 interface).

A program that causes a computer to execute each of the processing operations according to the embodiments described above may be provided. The program may be recorded in a computer-readable medium. Use of the computer-readable medium enables the program to be installed on a computer. Here, the computer-readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

Supplementary Note

INTRODUCTION

A work item related to Integrated Access and Backhaul (IAB) was approved in RAN #82. In RAN2 #107bis, the recovery from and the notification of a failure in the backhaul radio link (BH RLF) have been discussed in detail, and the following agreement has been reached.

R2 confirms that in a case that the IAB node is not configured with DC, process using the same mechanism and procedure as those of the RLF process of UE (including detection, recovery, and the like) currently prescribed in TS 38.331 is applied to the BH RLF. In a case that additional functional expansion is needed, further studies are necessary.

In a case that NR DC is configured for the IAB node, the RLF in 2.1 is detected separately in the MCG link and in the SCG link, and the existing UE procedure in 2.2 is used for failure process of the MCG link and the SCG link.

For the recovery from the BH RLF in the case of DC, reutilization of the MCG and SCG failure recovery procedure of UE is agreed as a work assumption, the reutilization being prescribed in Rel-16.

For the IAB node not configured with DC, RRC re-establishment is initiated in a case of reception of the downstream notification "failure in recovery".

In the case of DC, in a case of receiving the notification "failure in recovery" from the parent node of the MCG link or/and the SCG link, the IAB node considers that a failure has occurred in the radio link and uses the existing RRC or Rel-16 mechanism (e.g., MCG or SCG failure report, RRC re-establishment).

R2 assumes that in a case of a failure in RRC re-establishment, the RLF notification "failure in recovery" is triggered. However, whether this needs to be prescribed needs to be further studied.

The BAP layer is used to transmit the BH RLF notification.

R2 assumes the support of upstream BH RLF notification to the donor CU via the current F1-AP signaling.

The supplementary note discusses possible problems associated with a failure in the BH RLF recovery of the parent, particularly in terms of the operations of the MT and the UE. In addition, the supplementary note discusses other types of BH RLF notifications, in other words, notifications other than the "failure in recovery" notification.

DISCUSSION

Operations of MT at Time of Failure in BH RLF Recovery of Parent

RAN2 #107bis discussed what the BH RLF notification indicates and agreed that the BH RLF notification indicates the "failure in recovery" of the parent IAB node. However, some companies point out that this is very similar to simply turning off the cell.

- Ericsson considers that this need not be indicated but that the cell may be simply turned off. Kyocera agrees and considers that turning off the cell is easier. QC considers that this difference may be the operation performed by a downstream node.
- Huawei considers that this has already been agreed on.
- ZTE considers that indication of occurrence of an RLF is more useful than indication of a failure in recovery in allowing the downstream node to start preparing for the recovery. Intel agrees. LG considers both indications are useful. Ericsson also considers that more notification is required.
- Huawei considers that the operation of the MT in the indication should be focused on. Huawei considers that this mechanism needs to operate at high speed.
- Samsung considers that the failure in recovery is most important.
- NEC considers that turning off the cell is not a good idea because the backhaul of the cell may be recovered.

According to our understanding, based on the above discussions, the cell continues to transmit SSBs even after transmitting the BH RLF notification to the downstream node.

Observation 1: Common understanding may be that the cell continues to transmit SSBs even after the BH RLF notification is transmitted due to a failure in BH RLF recovery.

On the other hand, RAN2 has agreed that in a case of reception of the BH RLF notification, in other words, "failure in recovery" at a child IAB node, the existing recovery procedure is reutilized, specifically:

for the MT not configured with DC, RRC re-establishment is initiated;

for the notification from the MT and the SCG configured with DC, SCG failure recovery is initiated;

for the notification from the MT and the MCG configured with DC, MCG failure recovery is initiated; and for the notification from the MT and both MCG/SCG configured with DC, RRC re-establishment is initiated.

Figure 15:
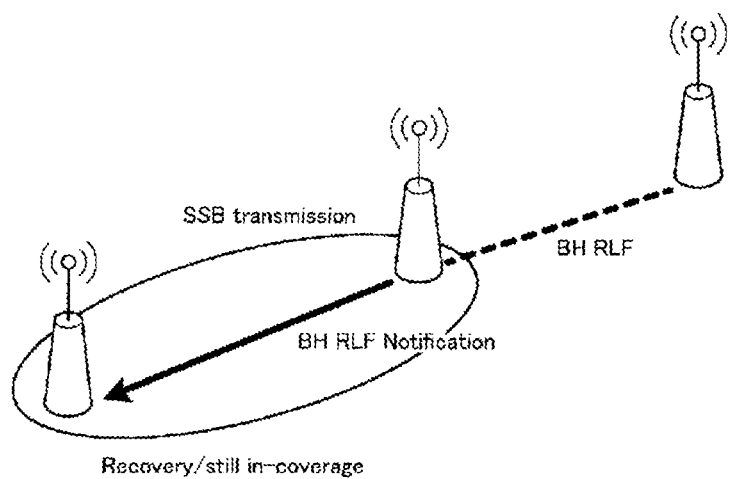
FIG. 15 is a diagram illustrating recovery using the BH RLF notification according to Supplementary Note, while being still within a coverage.

FIG. 15 is a diagram illustrating the recovery using the BH RLF notification while being still within the coverage.

Cell Selection after Reception of BH RLF

The RRC re-establishment procedure includes the cell selection process, and thus in a case that an appropriate cell is found, the MT re-selects the cell. In terms of Observation 1, the MT in the cell selection during RRC re-establishment may again select the cell transmitting the BH RLF notification because the cell is still transmitting SSBs. For example, even a child located in the center of the cell may receive the BH RLF notification from the parent. In other words, even in a case that the link between the child and the parent is still favorable, the RLF recovery of the link between the parent and a parent of the parent may have failed. Furthermore, the link may further be degraded due to the possibility for the parent to be constantly the best cell through appropriate deployment, particularly, Rel-16 supporting only fixed IAB nodes. The original assumption related to RRC re-establishment in the case of RLF only considers the radio state of the access link of the child rather than of the access link of the parent, thus the above-described scenario is not considered in the original assumption.

Observation 2: After reception of the BH RLF notification "failure in recovery", the cell is still transmitting SSBs, and thus the MT may select the same cell again.

Obviously, the BH RLF notification is introduced to quickly adapt the topology, and thus the operation in Observation 2 is not intended. In other words, the MT should select a cell that has not transmitted the BH RLF notification. Accordingly, RAN2 should find solutions for avoiding such erroneous cell selection. A simple method is, for example, to ensure that the cells to which the MT has transmitted the BH RLF notification are excluded from the candidates for cell selection, for example, by using a timer configured for up to 300 seconds or a timer configured by the gNB.

Proposal 1: RAN2 should agree that the cells to which the MT has transmitted the BH RLF notification "failure in recovery" may be excluded from the candidates for cell (re)selection for a particular period of time.

Conditional Handover in a Case of Reception of BH RLF Notification

In section 9.7.15 of TR 38.874, RAN2 has confirmed that for efficient BH RLF recovery, "an alternative backhaul link and an alternative route are prepared in advance (that is, before an RLF occurs)". This type of initiative approach is useful in a case that the backhaul link is suddenly degraded, particularly in the case of a millimeter-wave backhaul. In this case, the BH RLF, in other words, the failure in the communication between the CU and the DU precludes transfer of the dedicated RRC message including "RRC reconfiguration by synchronization", thus preventing the known handover from functioning.

Whether the conditional handover (CHO) discussed in Rel-16 NR mobility enhancement WI is useful for the initiative BH RLF recovery should be considered. The CHO is executed in a case that conditions for a measurement report event are satisfied (in other words, the case is the same as the case where the backhaul link is degraded), and thus the currently agreed CHO mechanism can be directly reused for the recovery of the backhaul link of the child.

Observation 3: The conditional handover may be configured for the IAB node for initiative BH RLF recovery.

On the other hand, additional discussion is required to determine how the CHO functions when the BH RLF notification is received, in other words, when in spite of a failure in the recovery of the backhaul of the parent, the backhaul of the parent is still favorable. For example, in the case of other than DC, in response to receiving the BH RLF notification "failure in recovery", the MT initiates the RRC re-establishment as agreed. Note that, in a case that the MT is already configured with the CHO (in other words, the backhaul link of the parent is still favorable), the CHO is desirably executed to allow the MT to access the prepared cell and the appropriate IAB node belonging to the same CU. This optimization is very simple but effective because the handover in related art does not function for the same reason as described above, in other words, due to a failure in the backhaul link between the CU and the DU. Consequently, RAN2 should agree with addition of one criterion for CHO execution. In other words, RAN2 should agree with addition of the case of reception of the BH RLF notification.

Proposal 2: RAN2 should agree that the MT executes the conditional handover in response to receiving of the BH RLF notification "failure in recovery" from the parent (in a case that such reception is configured).

Operations of UE at Time of Failure in BH RLF Recovery of Parent

As illustrated in the architecture including the architecture 1a of TR, the UE includes no BAP layer. This principle is particularly important for Rel-15 UE. In other words, IAB networking is transparent to UE regardless of the release of the specifications.

On the other hand, RAN2 has agreed that "the BH RLF notification is transmitted by using the BAP layer". This means that even in a case of the Rel-16 UE, the UE fails to receive the BH RLF notification. Furthermore, as described in Observation 1, the cell may continue to transmit SSBs even after the BH RLF recovery fails. As a result, the UE needs to wait for turn-off of the cell before RRC re-establishment, and the UE cannot receive service for a certain period of time. This may degrade user experience.

Observation 4: The UE fails to receive the BH RLF notification transmitted via the BAP layer.

Observation 5: In a case that the serving cell continues the SSB transmission in spite of a failure in the recovery of the serving cell from the BH RLF, the UE needs to wait for a long period of time before RRC re-establishment in some cases.

Figure 16:
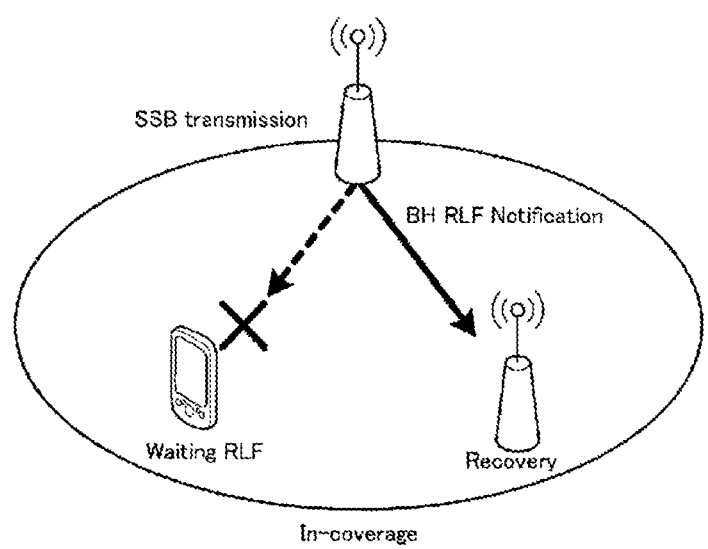
FIG. 16 is a diagram illustrating that a UE according to Supplementary Note cannot receive the BH RLF via a BAP.

FIG. 16 is a diagram illustrating that the UE cannot receive the BH RLF notification via the BAP.

With importance of the use case of URLLC in Rel-16 taken into account, the IAB networking may be inappropriate for IIoT deployment and the like unless the UE is allowed to execute operations at high speed for the BH RLF in the serving cell. Consequently, it is important to support a method for high-speed reconnection to cells for which at least the Rel-16 UE is appropriate.

Proposal 3: RAN2 should discuss methods for allowing the UE to quickly avoid the current serving cell that has failed in the BH RLF recovery in the case of at least the Rel-16 UE (that supports, for example, an industrial use case).

In a case that Proposal 3 can be agreed with, in terms of the discussion in RAN2, the SIB1 may broadcast any indication for notifying the Rel-16 UE of a failure in the BH RLF recovery to initiate RRC re-establishment in the case of non-DC or to recover from an MCG/SCG failure in the case of DC. This indication may be any alternative use of, for example, the BH RLF notification (in other words, "failure in recovery" in addition to BAP Control PDU), another type of the BH RLF notification (e.g., "recovery in progress"), a simple trigger for notifying the UE that RRC re-establishment/release is to be performed, and/or an indication of initial access (e.g., "TAB support indication" or integrated access control). Details should be discussed further.

Proposal 4: RAN2 should agree that an indication broadcast by the SIB1 notifies a failure in the BH RLF recovery, allowing the UE to initiate RRC re-establishment, MCG failure recovery, and/or SCG failure recovery. For the details of the indication, further studies are required.

Other Types of BH RLF Notifications

RAN2 agreed to support the type of BH RLF notification "failure in recovery" (that is, "type 4") and the corresponding operation of the MT, but whether to introduce other types of BH RLF notifications is an unsolved problem from mail discussions.

Type 1—"Plain notification": Indicates that an RLF in the BH link is detected by the child TAB node.

Type 2—"Trying to recover": Indicates that an RLF in the BH link is detected and that the child TAB node is trying to recover from the RLF.

Type 3—"BH link recovered": Indicates that the BH link has successfully recovered from the RLF.

Type 4—"Recovery failure": Indicates that the recovery from the RLF in the BH link has failed.

Type 4x—"Indicating child nodes to perform RLF procedure": This is implemented in a case where the parent transmits this indication, and in a case of receiving the indication, the child node should execute an RLF related procedure.

Note that the "child TAB node" can be considered to be the parent TAB node in order to maintain consistency with other lines.

In RAN2 #108, many companies actually proposed support of "type 1", "type 2", and "type 3". Consequently, it is worth further studying these options.

In addition to the current RAN2 agreement, there may no longer be a significant difference between "type 1" ("Plain") and "type 2" ("Trying to recover"), because the parent is specified to initiate one of RRC re-establishment, MCG failure report, or SCG failure report (that is, "type 2") in a case where a BH RLF is detected (that is, "type 1") and the parent is specified to stop the recovery procedure in a case where the recovery procedure is failed (that is, "type 4"). Consequently, "type 2" can be merged with "type 1". This makes the definition of "type 1" more simple and clearer.

Proposal 5: RAN2 should agree to introduce one additional BH RLF notification for "RLF detected". This implicates both "type 1" and "type 2".

In terms of the operation of the MT of the child when the "type 1" notification is received, it is natural to suspend a scheduling request and other uplink transmissions in order to avoid unnecessary power consumption and interference. Furthermore, in one MT implementation, the MT may initiate measurement of neighbor cells only for advance preparation for the next step (in other words, recovery after reception of "failure in recovery").

Proposal 6: In a case of agreeing with Proposal 5, RAN2 should agree that the MT should suspend uplink transmission (e.g., SR or the like) in a case of receiving "RLF detected" from the parent.

In a case where Proposal 6 can be agreed with, the MT is assumed to transition to the "suspension status" after receiving the "type 1" notification ("RLF detected") and further transitions to the "recovery status" after receiving the "type 4" notification ("recovery failure").

On the other hand, in a case where the BH recovery of the parent is successful, the MT should obviously return to "normal status". Given that the BAP Control PDU (for BH RLF notification) is for "one-shot" signaling, "type 3" ("BH link recovered") is required, for example, for the UE to resume uplink transmission.

Note that in a case where the additional notification proposed in Proposal 5 can be used to switch the "status" of the UE (in other words, switching can be performed between the "suspension status" and the "normal status" described above), individual formats and parameters for BAP Control PDUs (in other words, "PDU types" or "notification types") are not required. Note that although specification of "status" is not intended, in a case of receiving again an additional BH RLF notification (in other words, common to "type 1") after receiving the additional BH RLF notification, the MT simply considers the reception as "BH RLF recovered".

Proposal 7: for example, to switch the suspend/resume of uplink transmission (SR or the like), RAN2 should agree to support BH RLF notification of "BH link recovered" (that is, "type 3"), corresponding to BAP Control PDUs common to "RLF detected" (that is, "type 1").

The invention claimed is:

1. A communication control method comprising:
   by an Integrated Access/Backhaul (IAB) node relaying communication between a lower IAB node and an upper IAB node, detecting a failure in a first radio link between the upper IAB node and the IAB node;
   by the IAB node, in response to the detection of the failure, transmitting, to the lower IAB node, a first notification indicating both that the failure is detected by the IAB node and that a recovery is being attempted;
   by the lower IAB node, in response to the reception of the first notification, ceasing data transmission to the IAB node; and
   by the lower IAB node, resuming data transmission to the IAB node when receiving a second notification indicating that the recovery from the failure was successful.

2. The communication control method according to claim 1, further comprising:
   by the lower IAB node, in response to satisfaction of a condition that the IAB node fails to recover from the failure, executing a conditional handover from the IAB node to another IAB node.

3. A lower Integrated Access/Backhaul (IAB) node executing communication with an upper IAB node via a IAB node, the lower IAB node comprising:

a receiver configured to receive, from the IAB node, a first notification transmitted in response to detection of a failure in a first radio link between the upper IAB node and the IAB node, the first notification indicating both that the failure is detected by the IAB node and that a recovery is being attempted; and a controller configured to cease data transmission to the IAB node, in response to the reception of the first notification, wherein the controller resumes data transmission to the IAB node when receiving a second notification indicating that the recovery from the failure was successful.

4. A communication system comprising: a lower IAB node according to claim 3; and an IAB node.

5. A chipset for controlling a lower Integrated Access/ Backhaul (IAB) node executing communication with an upper IAB node via a IAB node, the chipset comprising: a processor and a memory coupled to the processor, the processor configured to:

receive, from the IAB node, a first notification transmitted in response to detection of a failure in a first radio link between the upper IAB node and the IAB node, the first notification indicating both that the failure is detected by the IAB node and that a recovery is being attempted; and cease data transmission to the IAB node, in response to the reception of the first notification; and resume data transmission to the IAB node when receiving a second notification indicating that the recovery from the failure was successful.

* * * * *